June 21, 1932.  H. H. HARRIS  1,864,134
LANDING GEAR
Filed May 29, 1930    2 Sheets-Sheet 1

Henry H. Harris, Inventor

By Dyke, Holden and Schaines
Attorneys

June 21, 1932.  H. H. HARRIS  1,864,134
LANDING GEAR
Filed May 29, 1930   2 Sheets-Sheet 2

Henry H Harris, Inventor

By Dyke, Holden and Scharies
Attorneys

Patented June 21, 1932

1,864,134

UNITED STATES PATENT OFFICE

HENRY H. HARRIS, OF DETROIT, MICHIGAN, ASSIGNOR TO NOBLE & HARRIS, OF DETROIT, MICHIGAN, A COPARTNERSHIP COMPOSED OF WARREN NOBLE AND HENRY H. HARRIS

LANDING GEAR

Application filed May 29, 1930. Serial No. 456,859.

This invention relates to landing gear for aircraft and has for its object to provide an improved type apparatus of this type which will provide more favorable landing conditions for a plane than it had by landing gear of conventional types.

An object of the invention is to provide a take-off and landing gear for air planes adapted for having the center of gravity of the airplane well towards the landing gear wheels during take-off and also for having the wheels well forward of the center of gravity when landing. By making such provision it is easier to get the tail up during take-off, the take-off time is reduced, and bending stresses on wings and fuselage are avoided permitting use of lighter fuselage construction, and the plane will not be subjected to likelihood of turning over when landing on soft ground.

It is a further object to provide automatic and manual means and likewise hydraulic and mechanical means for accomplishing the foregoing objects.

Still further, it is an object of the invention to provide a partially retractible landing gear which will involve only very slight change in planes as now constructed for its installation, the main feature being simply in the form of an auxiliary means added to conventional equipment to carry out the novel objects herein set forth.

Still further, it is an object of the present invention to provide an improved landing gear of the type described which may be manufactured at comparatively small cost, which may be readily installed, which will outwear any plane to which it is attached, which will require practically no attention and which may be easily installed on any type of plane.

Other objects and advantages either directly described or indirectly accruing from the favorable arrangement herein illustrated will become hereinafter apparent as reference is had to the accompanying drawings wherein is illustrated two embodiments of my invention, by way of example, and in which.

Figure 1:
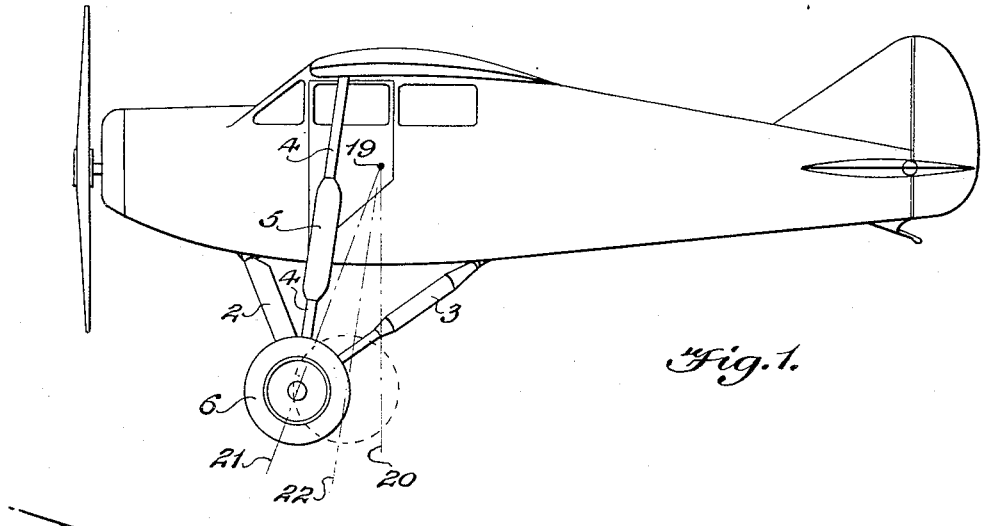
Figure 1 is a side elevation of a plane equipped with my novel landing gear.
Figure 2:
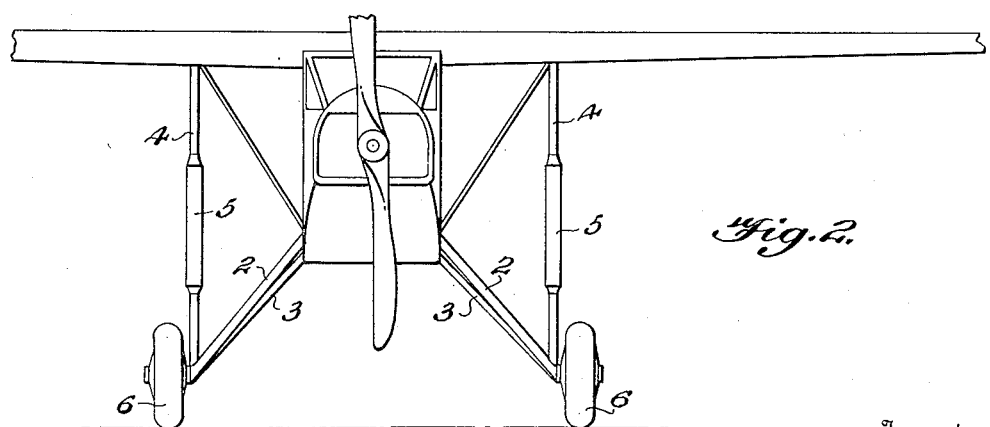
Figure 2 is a front elevation of the plane of Figure 1.

1 refers generally to a plane which might be any special or conventional plane but is herein illustrated as a monoplane equipped with an under carriage comprising the struts 2, 3, 4, the usual shock absorbers 5 and the wheels 6. The view of all these parts as they appear in Figures 1 and 2 is quite close to the conventional and varies therefrom in the structure of the strut 3 as will now be described.

Figure 3:
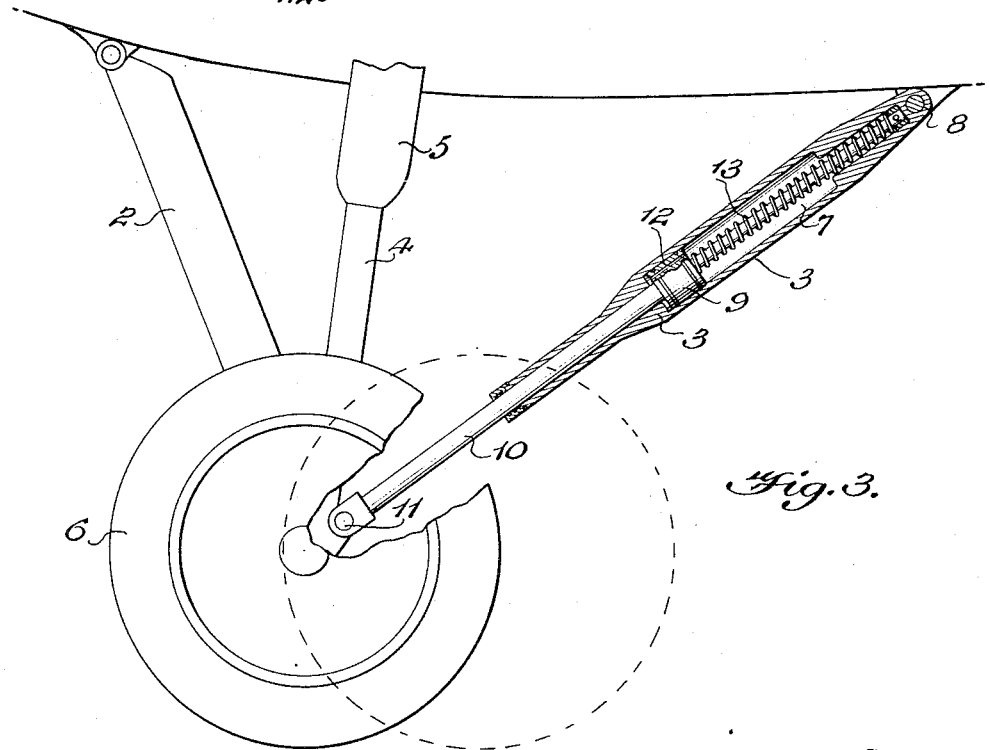
Figure 3 is an enlarged detail view of the novel landing gear.

This strut as illustrated in Figure 3 comprises a barrel portion 7 hinged at its upper end 8 to the fuselage and accommodating in the cylinder portion thereof a piston 9 having a piston rod 10 which extends outwardly of the barrel and is suitably pivoted to the struts 2 and 3 at 11. The piston 9 is ported at 12 so that upon filling the cylinder with oil or other suitable fluid a dash pot is formed. A spring 13 abuts the piston and the cylinder head urging the piston in the direction of the wheels 6. It will thus be seen that the strut 3 is definitely urged in elongated relation and that a positive pressure against the action of the spring 13 will permit a slow retraction of the piston 9 within the cylinder proportionate to the size of the port 12.

Figure 4:
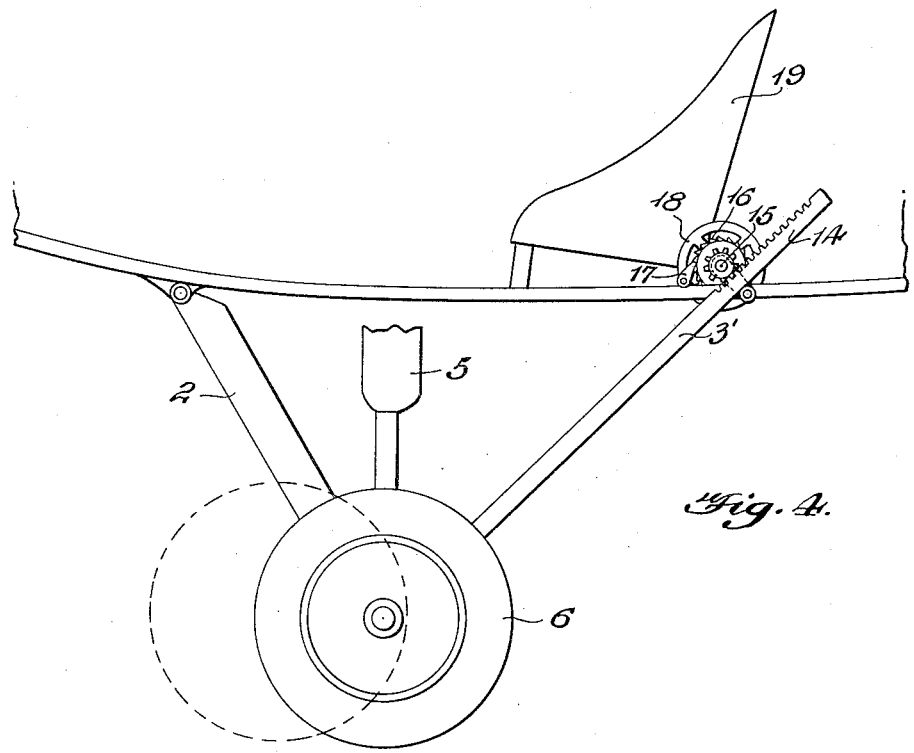
Figure 4 is an enlarged view of the under-carriage of a plane showing a modification of the arrangement of Figure 3.

Figure 4 shows a modification wherein the strut 3' is unitary and has a toothed rack 14 carried by the outer end thereof. This rack is toothed to receive the teeth of a gear 15 under the control of a ratchet wheel 16 and a dog 17. A wheel 18 is provided near the pilot's seat 19 in order that positioning of the wheels may be manually controlled.

Referring again to Figure 1, the wheels are shown in forward position which is the position for flight preparatory to landing. In the case of a strut 3, such as shown in Figure 3, the assumption of this position will be automatic while in the case of the modification of Figure 4 the pilot will manually place the wheels in this position by means of the wheel 18. The point 19 indicates the center of gravity of the plane and the line 19—20 is vertical. The lines 19—21 and 19—20 indicate the angle through which the wheels 6 are thrown forward from the vertical in order to prevent turning over or "pancaking" upon landing. As quickly as the weight of the plane rests upon the wheels the piston 9 begins to retract against the spring 13 until the center of the wheels is traversed by the line 19—22. In the case of the manual adjustment, the pilot merely releases the dog 17 and the ratchet will ride upwardly automatically. The wheels are then in the most favorable position for a take off and will, of course, remain in this position as long as the weight of the plane is upon them.

This invention may be developed within the scope of the following claims without departing from the essential features of the said invention, and it is so desired that the specification and drawings be read as being merely illustrative, and not in a limited sense, except as necessitated by the prior art.

What I claim is:

1. In combination with an airplane including a wing, a fuselage and an under carriage, said under carriage comprising wheels and a plurality of pairs of struts supporting said wing and said fuselage on said wheels, one pair of said struts being pivotally attached to the axles of said wheels to comprise a main support and including shock absorbers, another pair of said struts being pivotally attached to the axles of said wheels and to said fuselage and being forwardly inclined, a third pair of struts pivotally attached to the axles of said wheels and to said fuselage and being inclined rearwardly from said wheels, the members of said last named pair being extensible and retractible whereby said wheels may be swung through a predetermined angle with the upper pivots of the first named pair of struts as centers of the described arc, said struts being proportioned in length and positioned to swing said wheels forwardly of the center of gravity of said plane for landing and to retract said wheels to a point substantially beneath the center of gravity of said plane for taking off.

2. In combination with an airplane including a wing, a fuselage and an under carriage, said under carriage comprising wheels and a plurality of pairs of struts supporting said wing and said fuselage on said wheels, one pair of said struts being pivotally attached to the axles of said wheels to comprise a main support and including shock absorbers, another pair of said struts being pivotally attached to the axles of said wheels and to said fuselage and being forwardly inclined, a third pair of struts pivotally attached to the axles of said wheels and to said fuselage and being inclined rearwardly from said wheels, the members of said last-named pair being automatically extensible upon release of the weight of the plane from said wheels, and automatically and gradually retractible upon assumption of the weight of the plane by said wheels whereby said wheels may be swung through a predetermined angle with the upper pivots of the first-named pair of struts as centers of the described arc, said struts being proportioned in length and positioned to swing said wheels forwardly of the center of gravity of said plane for landing and to retract said wheels to a point substantially beneath the center of gravity of said plane for taking off.

3. In combination with an airplane including a wing, a fuselage and an under carriage, said under carriage comprising wheels and a plurality of pairs of struts supporting said wing and said fuselage on said wheels, one pair of said struts being attached to the axles of said wheels and to another portion of the airplane for pivotal movement to provide a main intermediate support and including shock absorbers, another pair of said struts being forwardly inclined and connected to the axles of said wheels and to said fuselage for pivotal movement, a third pair of struts being rearwardly inclined and connected to the axles of said wheels and to said fuselage for pivotal movement, said last named struts being yieldable longitudinally whereby said wheels may swing through a predetermined angle with the upper pivots of the first named pair of struts as centers of the described arc, all of said struts being proportioned in length and positioned to swing said wheels forwardly of the center of gravity of said plane for landing and to retract said wheels to a point substantially beneath the center of gravity of said plane for taking off.

4. In combination with an airplane including a wing, a fuselage and an under carriage, said under carriage comprising wheels and a plurality of pairs of struts supporting said wing and said fuselage on said wheels, one pair of said struts being attached to the axles of said wheels and to another portion of the airplane for pivotal movement to provide a main intermediate support and including shock absorbers, another pair of said struts being forwardly inclined and connected to the axles of said wheels and to said fuselage for pivotal movement, a third pair of struts being rearwardly inclined and connected to the axles of said wheels and to said fuselage for pivotal movement, said last named struts being yieldable longitudinally whereby said wheels may swing through a predetermined angle with the upper pivots of the first named pair of struts as centers of the described arc, all of said struts being proportioned in length and positioned to swing said wheels forwardly of the center of gravity of said plane for landing and to retract said wheels to a point substantially beneath the center of gravity of said plane for taking off, and means for actuating said longitudinally yieldable struts from the driver's seat for controlling the wheel positions.

In testimony whereof, I have signed my name hereto.

HENRY H. HARRIS.